May 3, 1932. T. M. JORDAN ET AL 1,856,917
SUCKER ROD COUPLING
Filed Oct. 11, 1930 2 Sheets-Sheet 1

INVENTOR
Thos. M. Jordan
William H. Herrington

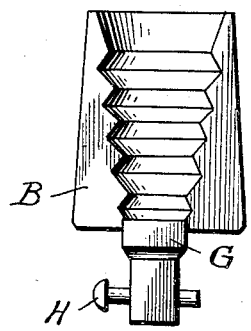
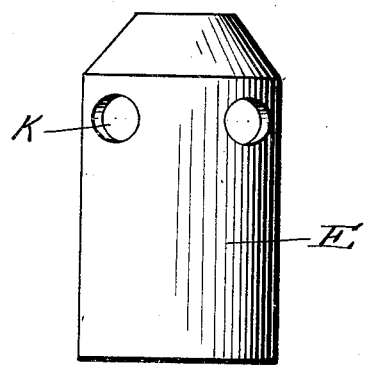
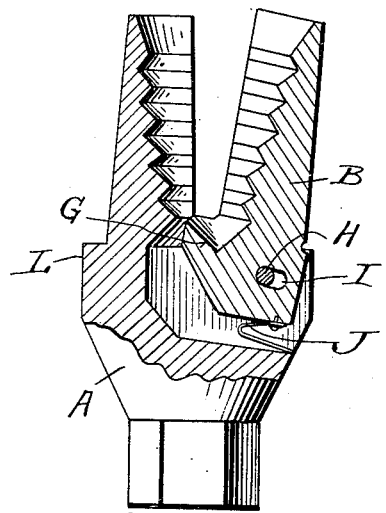
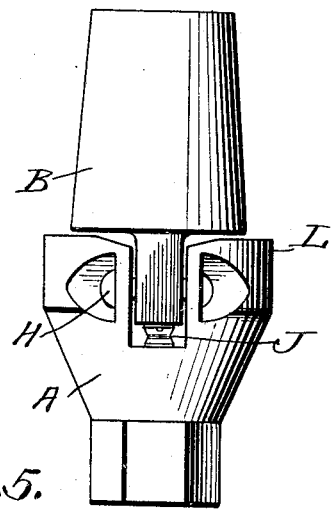

Patented May 3, 1932

1,856,917

UNITED STATES PATENT OFFICE

THOMAS M. JORDAN AND WILLIAM H. HERRINGTON, OF KOUNTZE, TEXAS

SUCKER ROD COUPLING

Application filed October 11, 1930. Serial No. 487,977.

Our invention relates to a sucker rod coupling and the like.

An object of our invention is to provide a coupling for sucker rods and the like which can be operated, that is, connected and disconnected in less time than couplings now in use.

Another object is to provide a coupling for sucker rods which connects and disconnects without threads, and without screwing pin into box, but connects pin into box by intermeshing tongue and groove pin into tongue and groove box, which pin is supplied or made with tongue and groove to corresponding tongue and groove in box.

Another object is to provide a coupling for sucker rods that will eliminate trouble of rods parting, and thereby prevent loss of time in pumping wells,—thereby increasing daily production of oil.

Another object is to provide a coupling for sucker rods which can be connected and disconnected in less time than what is now required,—thereby reducing labor, saving time and money.

Another object is to provide a coupling for sucker rods that will be simple and convenient in operation, economical in manufacturing, and which is durable.

The invention consists in the details of construction and in the combination and arrangement of the several parts of our improved sucker rod coupling whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawings, wherein:—

Fig. 4 represents side view of box of coupling, showing position of movable section of box, and showing a cross-section of stationary section of box in position for the entrance of pin.

Fig. 5 represents an outside view of movable section of box of coupling, showing bolt which attaches movable section to base of stationary section of box, on which movable section swings,—showing how movable section is attached to base of box of coupling.

Fig. 6 represents inner face view of movable section of box of coupling with bolt in place, also showing tongue and groove in movable section of box.

Fig. 7 represents a sleeve which fits over or around entire box when closed on pin,— thereby preventing sections of box from opening while rods are in well.

Figure 3:
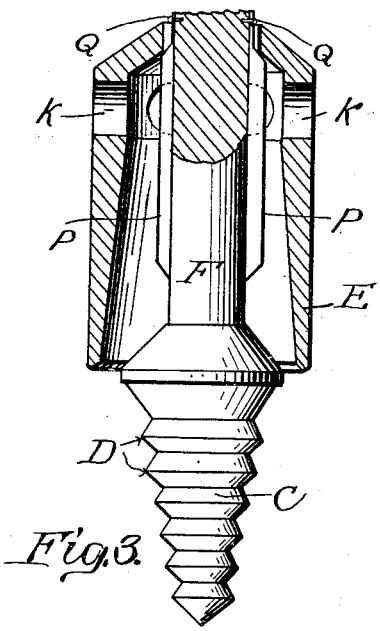
Fig. 3 represents pin of coupling, showing sleeve lifted; which sleeve has a slightly tapered bore to fit around tapered box, when box is closed on pin.
Figure 2:
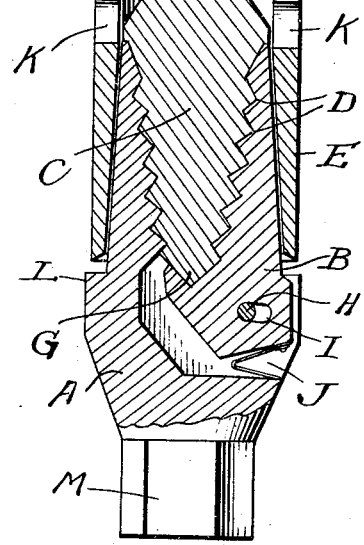
Fig. 2 represents cross-section of base of box of coupling and inside face view of stationary section of box of coupling.
Figure 1:
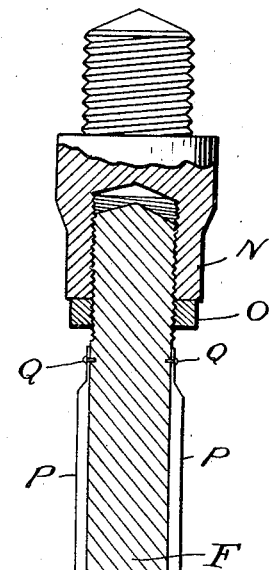
Fig. 1 represents the coupling with all parts assembled.

Referring to drawings:

Fig. 1: When sleeve E is raised, movable section B is released and allowed to open slightly, releasing pin C, which will be free to raise out of box,—this operation takes place when rods are being pulled out of well.

When rods are being put back into well the following operation: When pin C enters box, the movable section B opens and allows pin C to enter box freely, which pin C striking base G of movable section, swings movable section inward, causing it to fit tightly on pin C, then tongue and groove on pin C fits corresponding tongue and groove in box. Sleeve E, which is at this time raised above box, is then allowed to drop, and fits closely around entire box, thereby holding sections of box together—forming a complete coupling. This sleeve being slightly tapered to fit tapered box, takes up all slack, moving downward and wedging itself tightly around box.

When the two sections of the box are put together, a slightly tapered cylindrical box is formed, being a little smaller at top than bottom. Sleeve E is made slightly tapered to fit the tapered box.

Sleeve E is reduced at top to prevent sliding over pin C when pin C is disconnected from box. This reduction of sleeve however, does not interfere with sleeve passing down over box sufficiently to hold sections of box together. Sleeve fits loosely around shank F of pin C. Sleeve E has openings K for the purpose of allowing sand or other sediments which may collect in top of box, to escape.

Movable section B of box when in operation is pivoted on a bolt H, which works in an oblong hole I; this allowing free movement inward or outward as may be required to fit closely on pin C. Movable section B is held in position by a spring J. However, movable section B of box may be operated with or without spring J.

The base of box A is made large enough to project beyond the periphery of sleeve, shown at L. The purpose of this projection is to prevent sleeve E coming in contact with tubing, to eliminate possibility of sleeve E being moved or loosened by friction.

This new invented coupling may be made to fit into a string of standard sucker rods of various sizes. Box M on bottom of coupling, which may be made with threads to fit standard rods of various sizes, is for the purpose of connecting into string of sucker rods. Small pin N at top of shank F with threads to fit standard sucker rods of various sizes, is for the purpose of connecting into standard string of sucker rods.

This standard connection N on top of shank F is provided with a lock nut O. This lock nut O prevents pin N from working loose.

D represents tongue and groove on pin C and in box A, which tongue and groove on pin C fits into corresponding tongue and groove in box A, making a rigid connection when sleeve is dropped in position around box.

P represents flat springs which fastens to shank F by screws Q. The purpose of these springs is to hold up sleeve E when raised off of box, and also to prevent sleeve E from jarring upward when well is pumping. Sleeve may be easily raised by slight upward pull of hand, and lowered by slight downward pull of hand.

The above description may be more fully understood by referring to drawings hereto connected.

It is thought that the construction, operation, utility and advantages of this invention will now be apparent to those skilled in this art without a more detailed description thereof.

The present embodiment of this invention has been described for the purpose of exemplification, and it is to be understood that changes in the details of construction, and in the combination and arrangement of parts, may be resorted to without departing from the spirit or scope of the invention as hereinafter claimed.

Having thus described our invention, what we claim is:—

1. A sucker rod coupling comprising two members, one of said members including a ribbed pin and the other a grooved box to receive said pin to interlock therewith, said box comprising a fixed section and a swinging section, said swinging section having a base disposed in the path of the end of the pin as the pin enters between the sections of the box to tightly engage the pin between the sections, a sleeve carried by the member having the pin for sliding movement therealong, said sleeve being engageable over the sections of the second member to hold the pin clamped between said sections, and yieldable means carried by the second member and coacting with the sleeve to hold the sleeve in applied position with respect to the sections of the box, said means upon movement of the sleeve to unapplied position yieldably maintaining the sleeve in such unapplied position.

2. A sucker rod coupling comprising two members, one of said members including a ribbed pin and the other a grooved box to receive said pin to interlock therewith, said box comprising a fixed section and a swinging section, said swinging section having a base to be engaged by the end of pin as the pin enters between the sections of the box to tightly engage the pin between the sections, a sleeve carried by the member having the pin for sliding movement therealong, said sleeve being engageable over the sections of the second member to hold the pin clamped between said sections, and yieldable means carried by the second member and coacting with the sleeve to hold the sleeve in applied position with respect to the sections of the box, said means also serving to hold the sleeve raised with respect to the pin.

3. In a sucker rod coupling comprising two members including a pin and a socket to receive the pin, a sleeve longitudinally movable on one of the members, and resilient means mounted on said one member and adapted to engage the sleeve upon longitudinal movement thereof whereby to retard the movement of the sleeve on said one member, one end of said resilient means resiliently holding said sleeve in locked position about said pin and socket and the opposite end upon movement of the sleeve into disengaged position holding the sleeve in disengaged position.

4. In a sucker rod coupling comprising two members, one having a pin and the other a socket to receive the pin, a sleeve longitudinally movable on the first of said members, a pivoted locking member carried by the socket and having grooves on the inner face thereof whereby to engage the ribbed portion of the pin, said locking member having an inwardly extending base portion disposed in the path of the inner end of the pin whereby to rock the locking member into locking engagement upon contact of the pin with said base portion, and a plurality of resilient members mounted on said first member and adapted to engage the sleeve upon longitudinal movement thereof whereby to retard the movement of the sleeve on said first member, one end of said resilient means resiliently holding said sleeve in locked position about said pin and socket and the opposite end upon movement of the sleeve into disengaged position holding the sleeve in disengaged position.

In testimony whereof we have affixed our signatures.

THOS. M. JORDAN.
WILLIAM H. HERRINGTON.